Patented Apr. 16, 1935

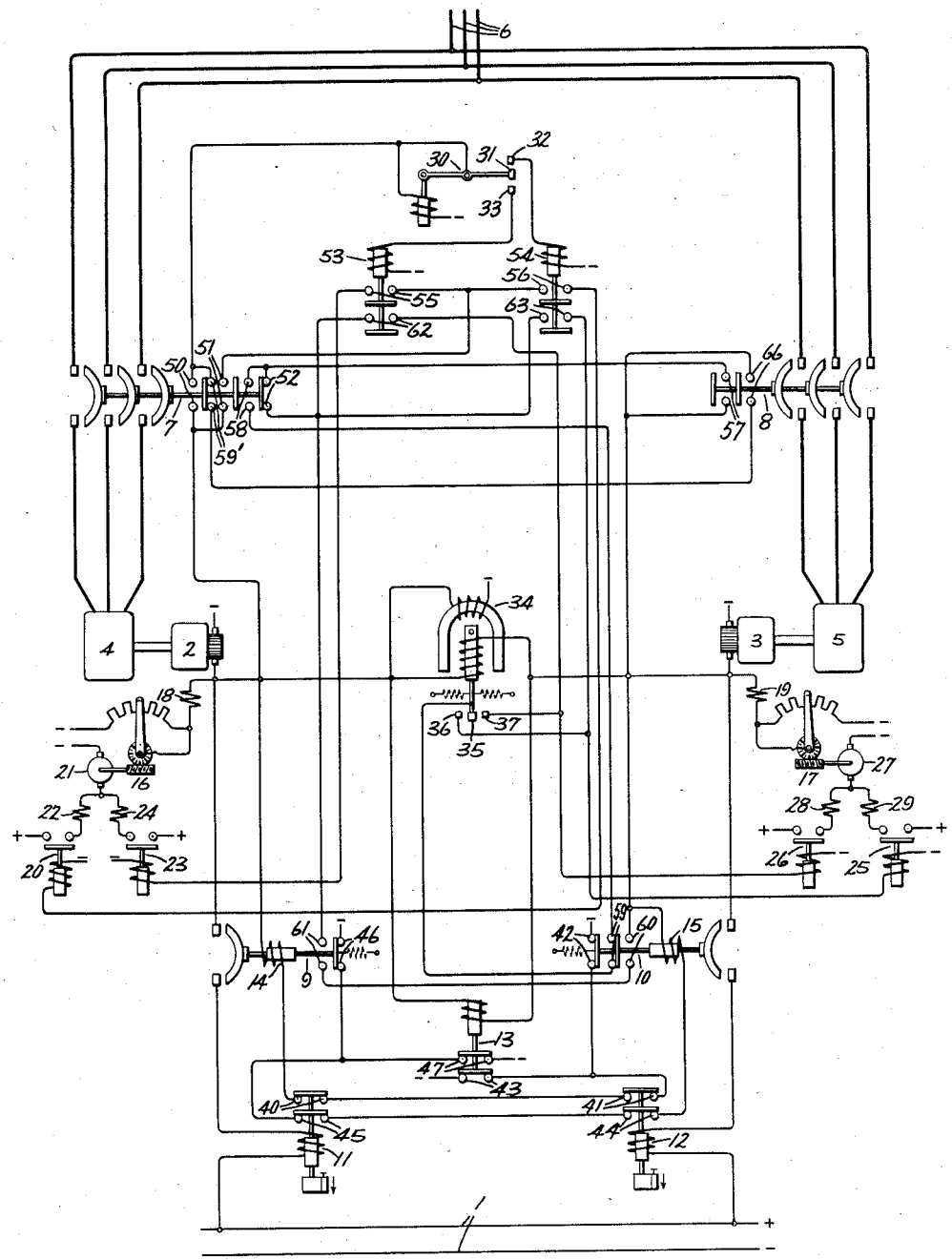

1,998,302

UNITED STATES PATENT OFFICE 1,998,302

REGULATING SYSTEM

Herman Bany, Lansdowne, Pa., assignor to General Electric Company, a corporation of New York Application October 17, 1934, Serial No. 748,633

7 Claims. (Cl. 171—118)

My invention relates to regulating systems and particularly to systems for regulating a predetermined electrical condition, such as the voltage, of a plurality of sources of current which are arranged to supply current in parallel to a common load circuit.

One object of my invention is to provide an improved regulating system for maintaining constant the voltage of whichever source is in operation when only one of the sources is in operation.

Another object of my invention is to provide an improved regulating system for maintaining the voltages of two sources equal and at a predetermined value when both of the sources have been started and one or both of them are disconnected from the load circuit.

Further objects of my invention will appear and my invention will be better understood from the following description when taken in connection with the accompanying drawing which diagrammatically illustrates a voltage regulating system embodying my invention and its scope will be pointed out in the appended claims.

Referring to the drawing, 1 represents a direct current load circuit which is arranged to be supplied with current from a plurality of sources of current which may be of any suitable type. As shown in the drawing, the sources of current are direct current generators 2 and 3, which are respectively driven by suitable driving means such as alternating current motors 4 and 5. The motors 4 and 5 are arranged to be connected to a suitable alternating current supply circuit 6 by suitable circuit breakers 7 and 8 respectively.

The generator 2 is arranged to be connected to the load circuit 1 by a circuit breaker 9 and the generator 3 is arranged to be connected to the load circuit 1 by means of a circuit breaker 10. These circuit breakers 9 and 10 may be of any suitable type, and any suitable control means, examples of which are well known in the art, may be provided for effecting the closing of each of these two circuit breakers when the associated source is in an operative condition to supply current to the load circuit and for effecting the opening of each circuit breaker under predetermined abnormal circuit conditions. In order to simplify the disclosure, the circuit breaker 9 in the particular arrangement shown is arranged to be closed when the voltage of the source 2 is above a predetermined value, the load current supplied by each source is below a predetermined value and either the circuit breaker 10 is open or the difference between the voltages of the sources 2 and 3 is less than a predetermined value. The circuit breaker 10 is arranged in a similar manner to be closed when the voltage of the source 3 is above a predetermined value, the load current supplied by each source is below a predetermined value and either the circuit breaker 9 is open or the difference between the voltages of the sources 2 and 3 is less than a predetermined value. These results are obtained by providing the overcurrent relays 11 and 12 which are connected so as to open their contacts in response to currents above a predetermined value respectively supplied by the sources 2 and 3 to the load circuit, a voltage difference relay 13 which is connected so that it closes its contacts when the difference between the voltages of the sources 2 and 3 is below a predetermined value, and the closing coils 14 and 15 for the circuit breakers 9 and 10, which closing coils are so connected through suitable contacts of the relays 11, 12 and 13 that they are energized by the voltages of sources 2 and 3 respectively under the predetermined conditions under which it is desired to have the associated circuit breakers closed.

Any suitable means may be provided for starting each source and placing it in condition to supply current to the load circuit 1. Suitable automatic switching means for accomplishing this result are well known in the art and preferably such automatic switching means will be used in practice to start each of the driving motors. However, in order to simplify the disclosure, I have shown an individual manually operated circuit breaker for starting each of the motors by connecting it directly to the supply circuit 6 and have shown the various control devices which are controlled by the starting means as being controlled in accordance with the positions of the manually operated circuit breakers.

For controlling the voltages of the two sources 2 and 3, I provide the motor operated rheostats 16 and 17 respectively in the circuits of the shunt field windings 18 and 19 of these two sources. Associated with the rheostat 16 is a voltage raising control relay 20 which, when energized, completes a circuit for the rheostat motor 21 and its field winding 22 so that the motor operates in a direction to cut out resistance in series with the shunt field winding 18 of source 2. Also associated with the rheostat 16 is a voltage lowering control relay 23 which, when energized, completes a circuit for the rheostat motor 21 and its field winding 24 so that the motor operates in a direction to insert resistance in the circuit of the shunt field winding 18. Associated with the rheostat 17 are the voltage raising control relay 25 and voltage lowering control relay 26 which, when energized, complete circuits for the rheostat motor 27 and its field windings 29 and 28 respectively so that the motor operates in the proper direction to either cut out resistance or cut in resistance in the circuit of the shunt field winding 19.

For controlling the operation of the motor operated rheostats 16 and 17, I provide a regulating relay 30 which is arranged to close its contacts 31 and 32 when the voltage applied to the operating winding of the relay is below a predetermined value, to close its contacts 31 and 33 when the voltage applied to its operating winding is above a predetermined value and to maintain all of its contacts open when the voltage applied to its operating winding is at a predetermined value. Also, I provide a second regulating relay 34 which is connected to the sources 2 and 3 in any suitable manner so that when the voltage of the source 2 exceeds the voltage of the source 3 more than a predetermined amount, the relay closes its contacts 35 and 36, when the voltage of the source 3 exceeds the voltage of the source 2 more than a predetermined amount, the relay closes its contacts 35 and 37 and when the difference between the voltages of the sources 2 and 3 is less than said predetermined value, all of the relay contacts are open.

In accordance with my invention, I control the connections of the relays 30 and 34 and their respective contacts by means of auxiliary contacts on the circuit breakers 7 and 8 so that when only one of the starting means has been operated the voltage relay 30 is connected so that it responds to the voltage of the source that has been started and so that the associated rheostat is the only one that is controlled by the relay 30. When both of the starting means have been operated, the voltage relay 30 is connected so that it responds to the voltage of source 2 only and with the circuit breakers 9 and 10 closed it controls both of the rheostats 16 and 17. With the circuit breaker 10 open, however, the voltage relay 30 controls under these conditions only the rheostat 16 and the regulating relay 34 controls the rheostat 17. How these various results are accomplished by means of the auxiliary contacts on the circuit breakers 7 and 8 will be more clearly pointed out in the following description of the operation of the arrangement disclosed in the drawing.

When it is desired to place either of the sources in operation, the starting means therefor is first operated and then when the source is in a condition to supply current to the load circuit it is connected thereto. In the arrangement shown, when it is desired to place the source 2 in operation, the circuit breaker 7 is closed to effect the starting of the driving motor 4. When the voltage of the source 2 exceeds a predetermined value, a circuit is completed across the source 2 for the closing coil 14 of the circuit breaker 9 through contacts 40 of the overcurrent relay 11, contacts 41 of the overcurrent relay 12 if the current through the circuit breaker 10 is below a predetermined value and either the auxiliary contacts 42 of circuit breaker 10, if it is open, or the contacts 43 of the relay 13, if the difference between the voltages of the sources 2 and 3 is less than a predetermined value. Similarly, when it is desired to place the source 3 in operation, the circuit breaker 8 is closed to effect the starting of the driving motor 5. When the voltage of the source 3 exceeds a predetermined value a circuit is completed across the source 3 for the closing coil 15 of the circuit breaker 10 through contacts 44 of the overcurrent relay 12, contacts 45 of the overcurrent relay 11 if the current through the circuit breaker 9 is below a predetermined value and either the auxiliary contacts 46 on the circuit breaker 9, if it is open, or the contacts 47 of relay 13 if the difference between the voltages of the sources 2 and 3 is less than a predetermined value.

In case the current output of either source exceeds a predetermined value, the associated overcurrent relay operates to open the circuits of the closing coils of both of the circuit breakers 9 and 10 so that they both open. Any suitable reclosing means, examples of which are well known in the art, may be provided for effecting the reclosure of each circuit breaker after it has been opened by an abnormal circuit condition. As shown, each overcurrent relay is of the well known type which does not close its contacts until after its winding has been deenergized for a predetermined time interval. Therefore, after either overcurrent relay is operated in response to an overcurrent, it maintains both of the circuit breakers 9 and 10 open for a predetermined time interval after which it effects the simultaneous reclosing of both of these circuit breakers if both sources are in an operative condition to supply current to the load circuit.

The operation of the regulating means shown is as follows. Whenever the circuit breaker 7 is operated to effect the starting of the source 2, the voltage regulating relay 30 is connected across the source 2 by the auxiliary contacts 50 on the circuits breaker 7 so that the relay 30 responds to the voltage of source 2 only, whether or not the source 2 is connected to the load circuit 1. Also, due to the closing of the auxiliary contacts 51 and the opening of the auxiliary contacts 52 on circuit breaker 7 when it is closed, the raising relay 53 and the lowering relay 54, which are controlled by the position of the voltage relay 30, are arranged to control the rheostat 16 of source 2. For example, if the voltage of the source 2 is above a predetermined value, voltage relay 30, by closing its contacts 31 and 33, completes through auxiliary contacts 50 on circuit breaker 7 an energizing circuit for lowering relay 53 across the source 2. Relay 53 by closing its contacts 55 completes through the auxiliary contacts 51 on circuit breaker 7 an energizing circuit for the voltage lowering relay 23 across the source 2 so that the rheostat 16 is operated in a manner to decrease the voltage of the source 2. If the voltage of the source 2 is below a predetermined value, relay 30, by closing its contacts 31 and 32, completes through the auxiliary contacts 50 on circuit breaker 7 an energizing circuit for raising relay 54 across the source 2. Relay 54 by closing its contacts 56 completes through the auxiliary contacts 51 on circuit breaker 7 an energizing circuit for voltage raising relay 20 across the source 2 so that the rheostat 16 is operated in a manner to increase the voltage of source 2.

When the source 2 is in operation and the source 3 is started by the closing of the circuit breaker 8 the regulating relay 30 also controls the voltage of source 2 in the manner above described. After the circuit breaker 8 is closed and before the source 3 is connected to the load circuit 1 by the circuit breaker 10 the voltage of the source 3 is controlled by the regulating relay 34 so as to maintain the voltages of sources 2 and 3 equal.

If the voltage of the source 2 exceeds the voltage of source 3 sufficiently to cause the relay 34 to close its contacts 35 and 36, a circuit is completed across source 3 through the auxiliary contacts 57 on circuit breaker 8, the auxiliary contacts 58 on circuit breaker 7, the auxiliary contacts 59 on circuit breaker 10, and the contacts 35 and 36 of relay 34, for the voltage raising relay 25 so that the rheostat 17 is operated in a manner to increase the voltage of source 3. If the voltage of the source 3 exceeds the voltage of the source 2 sufficiently to cause the relay 34 to close its contacts 35 and 37, a circuit is completed across source 3 through the auxiliary contacts 57 on circuit breaker 8, the auxiliary contacts 58 on circuit breaker 7, the auxiliary contacts 59 on circuit breaker 10, and the contacts 35 and 37 of relay 34 for the voltage lowering relay 26 so that the rheostat 17 is operated in a manner to decrease the voltage of the source 3.

When, however, the circuit breaker 10 is closed so that only the source 3 is connected to the load circuit 1, and the circuit breaker 7 is closed to start the source 2 the rheostat 17 is removed from the control of the voltage relay 30 by the opening of the auxiliary contacts 52 on circuit breaker 7. Therefore, during the starting operation of the source 2 under these conditions, no change in the regulation of the voltage of source 3 is effected. When both of the circuit breakers 10 and 9 are closed, however, and the lowering relay 53 is energized, a circuit is completed across source 3 through the auxiliary contacts 60 on circuit breaker 10, the auxiliary contacts 61 on the circuit breaker 9, and the contacts 62 of lowering relay 53 for the voltage lowering relay 26 so that the rheostat 17 is operated in a manner to decrease the voltage of source 3. When the raising relay 54 is operated under similar conditions, a circuit is completed across source 3 through the auxiliary contacts 60 on circuit breaker 10, the auxiliary contacts 61 on circuit breaker 9 and the contacts 63 of the raising relay 54 for the voltage raising relay 25 so that the rheostat 17 is operated in a manner to increase the voltage of the source 3.

When only the source 3 is in operation, the voltage relay 30 is connected across the source 3 by the auxiliary contacts 59' on circuit breaker 7 and the auxiliary contacts 66 on circuit breaker 8 so that this relay responds to the voltage of the source 3. Under these conditions, when the lowering relay 53 is energized in response to the operation of the voltage relay 30, an energizing circuit is completed across source 3 through the auxiliary contacts 57 on circuit breaker 8, the auxiliary contacts 52 on circuit breaker 7, and the contacts 62 of relay 53 for the voltage lowering relay 26 so that the rheostat 17 is operated in a manner to decrease the voltage of the source 3 and when the raising relay 54 is energized in response to the operation of the voltage relay 30, an energizing circuit is completed across source 3 through the auxiliary contacts 57 on circuit breaker 8, the auxiliary contacts 52 of circuit breaker 7, and the contacts 63 of relay 54 for the voltage raising relay 25 so that the rheostat 17 is operated in a manner to increase the voltage of the source 3.

From the above description it will be seen that whenever the source 2 is in operation, the voltage relay 30 is connected so that it responds to the voltage of the source 2 only, and this voltage relay controls the operation of the rheostat 16 in the shunt field circuit of source 2, that when only the source 3 is in operation, the voltage relay 30 is connected so as to respond to the voltage of source 3 and this relay controls the rheostat 17 in the shunt field circuit of source 3, and that when both of these sources are in operation, the rheostat 17 is controlled by the relay 34 if the circuit breaker 10 is open and circuit breaker 9 is closed and by the voltage relay 30 if the circuit breakers 9 and 10 are closed.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:—

1. In combination, two sources of current, starting means for each source, regulating means for each source, a regulating relay, and means controlled by said starting means for causing said relay to respond to a predetermined electrical condition of said sources and to control the regulating means of only a certain one of said sources when a predetermined one and when both of said starting means are operated and to transfer the connections of said relay so that it responds to a different electrical condition of said sources and controls only the other regulating means when only the other of said starting means is operated.

2. In combination, two sources of current, starting means for each source, voltage regulating means for each source, a voltage relay, and means controlled by said starting means for causing said relay to respond to the voltage of one of said sources and to control the regulating means therefor when the starting means for said one of said sources and for both of said sources have been operated and to transfer the connections of said relay so that it responds to the voltage of the other source and controls only the regulating means therefor when only the starting means for said other source has been operated.

3. In combination, two sources of current, starting means for each source, regulating means for each source, a regulating relay, means controlled by said starting means for causing said relay to respond to a predetermined electrical condition of said sources and to control the regulating means of only a certain one of said sources when a predetermined one and when both of said starting means are operated and to transfer the connections of said relay so that it responds to a different electrical condition of said sources and controls only the other regulating means when only the other of said starting means is operated, and means controlled by said starting means for operating said other regulating means in response to a third electrical condition of said sources when both of said starting means have been operated.

4. In combination, two sources of current, starting means for each source, voltage regulating means for each source, a voltage relay, means controlled by said starting means for causing said relay to respond to the voltage of one of said sources and to control the regulating means therefor when the starting means for said one of said sources and for both of said sources have been operated and to transfer the connections of said relay so that it responds to the voltage of the other source and controls only the regulating means therefor when only the starting means for said other source has been operated, and means controlled by said starting means for operating the voltage regulating means for said other source in response to the relative voltages of said two sources when both of said starting means have been operated.

5. In combination, a load circuit, two sources of current for said circuit, an individual circuit breaker for connecting each source to said load circuit, starting means for each source, regulating means for each source, two regulating relays respectively responsive to different electrical conditions of said sources, and means controlled by said starting means and said circuit breakers for causing one of said relays to control a certain one of said regulating means whenever a certain one of said starting means has been operated and to control the other regulating means when the other starting means only has been operated and when both of said circuit breakers are closed and for causing the other of said regulating relays to control said other regulating means when the associated circuit breaker is open, the other circuit breaker is closed and both of said starting means have been operated.

6. In combination, a load circuit, two sources of current for said circuit, an individual circuit breaker for connecting each source to said load circuit, starting means for each source, regulating means for each source, a voltage relay, a relay responsive to the relative voltages of said sources, and means controlled by said starting means and said circuit breakers for causing said voltage relay to control a predetermined one of said regulating means whenever the starting means for the associated source has been operated and also to control the other regulating means when both of said circuit breakers are closed and when the starting means for the source controlled by said other regulating means is the only one that has been operated and for causing the other relay to control said other regulating means when the associated circuit breaker is open, the other circuit breaker is closed and both of said starting means have been operated.

7. In combination, two sources of current, starting means for each source, regulating means for each source, a voltage relay, a relay responsive to the difference between the voltages of said sources and means controlled by said starting means for causing said voltage relay to control only one of said regulating means under certain predetermined conditions of said sources and starting means and both of said regulating means under other predetermined conditions of said sources and starting means and for causing said other relay to control one of said regulating means under predetermined conditions of said sources and starting means.

HERMAN BANY.